United States Patent
Ozer et al.

(10) Patent No.: US 10,272,338 B2
(45) Date of Patent: Apr. 30, 2019

(54) METHOD AND SYSTEM FOR CREATING COMPUTER-BASED MULTI-USER INTERACTIVE ENVIRONMENTS HAVING AUTOMATICALLY VALIDATED RULES

(71) Applicant: FATHOMD, INC., Dallas, TX (US)

(72) Inventors: Ali Ozalp Ozer, Dallas, TX (US); Oleg Plakhotniuk, Richardson, TX (US)

(73) Assignee: FATHOMD, INC., Dallas, TX (US)

(*) Notice: Subject to any disclaimer, the term of this patent is extended or adjusted under 35 U.S.C. 154(b) by 0 days.

(21) Appl. No.: 15/400,138

(22) Filed: Jan. 6, 2017

(65) Prior Publication Data

US 2017/0189812 A1  Jul. 6, 2017

Related U.S. Application Data

(60) Provisional application No. 62/275,396, filed on Jan. 6, 2016.

(51) Int. Cl.
*A63F 13/60* (2014.01)
*A63F 13/45* (2014.01)
*A63F 13/48* (2014.01)
*A63F 13/30* (2014.01)

(52) U.S. Cl.
CPC ............. *A63F 13/60* (2014.09); *A63F 13/30* (2014.09); *A63F 13/45* (2014.09); *A63F 13/48* (2014.09); *A63F 2300/8094* (2013.01)

(58) Field of Classification Search
CPC ........................................ A63F 13/60
See application file for complete search history.

(56) References Cited

U.S. PATENT DOCUMENTS

2002/0021272 A1* 2/2002 Zeh .................. A63F 13/10 345/87
2010/0144444 A1* 6/2010 Graham ............ A63F 13/10 463/42

* cited by examiner

*Primary Examiner* — Omkar A Deodhar
(74) *Attorney, Agent, or Firm* — Lando & Anastasi, LLP

(57) ABSTRACT

A method for validating an interactive environment design includes receiving a stage descriptor of at least one game stage of a game instance and a user role to be performed by a user during the at least one game stage; receiving a plurality of parameter values and a proposed state function; and validating that the proposed state function will generate an expected result. A method for creating a computer-based multi-user interaction session includes presenting a first user with a descriptor of at least one game; receiving, from the first user via a first user interface, a selection of the at least one game and an instance identifier; creating an instance of the game associated with the instance identifier; receiving, from a second user via a second user interface, input comprising the instance identifier; and enrolling the second user in the instance of the game associated with the instance identifier.

19 Claims, 7 Drawing Sheets

Home / Student / gnug

Investment Game (round 4, hosted by John Doe)

Time left

Dear student,

Imagine that you have $100, and there's an opportunity for the investment in a public project. All invested money is multiplied by 150% and divided equally among all participants. How much money would you invest? — 460

$ | 76| | ◆ | Invest

— 470

Last round you invested  $76
You gained  $41  — 480
Your total assets are now  $235

Fathomd

Sign out  Mary Doe

METHOD AND SYSTEM FOR CREATING COMPUTER-BASED MULTI-USER INTERACTIVE ENVIRONMENTS HAVING AUTOMATICALLY VALIDATED RULES

CROSS REFERENCE TO RELATED APPLICATIONS

This application claims priority under 35 U.S.C. § 119(e) to U.S. Provisional Application Ser. No. 62/275,396, titled "METHOD AND SYSTEM FOR CREATING COMPUTER-BASED MULTI-USER INTERACTIVE ENVIRONMENTS HAVING AUTOMATICALLY VALIDATED RULES," filed Jan. 6, 2016, which is incorporated herein by reference in its entirety.

BACKGROUND

Technical Field

This application relates generally to computer-based multi-user interactions, such as educational games, and more particularly, in one aspect, to the automatic validation of the logic employed in such interactions, and handling in-game changes in the participants and/or parameters of such interactions.

Background

Computer-based multi-user interactive environments, such as educational multi-player online games, are well-known. One requirement for such environments (and software in general) is that, to the extent possible, they must avoid such situations as divide-by-zero errors, numeric overflow, and "endless loops", while at the same time performing within known memory and computation time limits. A divide-by-zero error occurs when a mathematical division is performed with a denominator of zero, causing unexpected results and/or program crashes. Numeric overflow occurs when a numerical operation is performed, but the result cannot be represented by the allocated bytes in memory. The stored result is therefore incorrect, leading to subsequent data issues, system instability or unavailability, or other issues. Similarly, an endless loop may cause a set of instructions to be repeated endlessly, causing the program to hang indefinitely until it crashes or is forcibly stopped. Endless loops involving memory write operations may also cause the program to consume all available system resources. Even without endless loops, the program cannot operate if it requires more memory or processing time than is available. This is especially important for multi-user environments where resource consumption increases with the number of users. The rate at which resource usage increases in a multi-user environment may be linear, or even exponential.

Another consideration for existing gaming products (e.g., those played in classroom settings) is their dependency on technology solutions that require labor-intensive, manual actions by users. Playing such games often requires the administrator (e.g., the instructor) to set up the game, configure the game parameters, and invite players (e.g., students) to participate long before the lecture starts. Any adjustment further delays execution of the game session and diminishes the probability that the session will be completed in the allotted time. For games that are conducted in a class session of limited time (e.g., 60 minutes), these maintenance/clerical tasks may consume roughly 20% of overall class time.

The execution of such an existing game during a classroom session—in which the instructor operates the game via a web-based platform—would proceed as follows. First, well before the start of the classroom session, an instructor would create a "new class" in the platform, and then create a list of specific names and email addresses for that class. This requires the instructor to compile a list (e.g., in a spreadsheet) of these names and email addresses beforehand, and then upload or type them into the platform to form the "new class." Such an operation can require 15-20 minutes or longer to complete for typical class sizes of 50 players.

Next, the instructor configures the specific game session via a game configuration procedure. The game configuration may include configuring the parameters of the game, the number of rounds, or the length of time allotted for the game, and may also include associating a specific class with the game session. Once set, these parameters become fixed for the game session. This includes the class size, meaning that the number of players is fixed for the duration of the game. The platform then emails (or otherwise communicates to) each player identified as part of the class that will play the game with a player-specific unique link through which players join the session.

During gameplay, any alteration to the game configuration requires restarting a new, separate game session with those updates. Of course, this restart delays the entire session while changes are made, because any changes would entail proceeding through each of the aforementioned steps for game configuration. In the case of unannounced no-shows (e.g., a student deciding not to show up to the class session), or any players arriving late or leaving early, the game is prevented from progressing if the correct number of players (as specified during the configuration of the game) is not active in the session. But adding or removing players from the class requires that the game-session configuration for that class itself must also be updated. Regardless of the changes to parameters, time, or players, for example, new links may need to be sent to players to re-invite them to the correct game session. At minimum, the game needs to be restarted from the beginning. This restart interrupts the flow and extends the overall duration of the game. Typically this process may require an additional 10-20 minutes to complete.

As a result, changes to game sessions may be avoided in practice. This can limit the capability of players to play at all (e.g., a late arrival is simply excluded), or may curtail the ability to alter the environment so that players experience the full range of game situations. For example, modifying the time allotted for the game, or changing parameters that alter game outcomes, may be disallowed. Furthermore, technical stability and reliability issues (such as program crashes due to numerical overflow or excessive computation or memory) during a limited time game play session with an audience (e.g., students) must be avoided. Such technological considerations make it difficult for educators/managers to adopt such games in education or live management demonstration sessions.

SUMMARY

Presently disclosed embodiments overcome the technical problems of prior art solutions by minimizing system resource usage—and wasted participant time—by gracefully handling logic or computational errors introduced by users, and by allowing in-game changes to the number or identity of game participants, or to game parameters, without requiring restart of the game session, or creation of a new game session.

It will be appreciated that professional programmers of distributed multi-user environments know how to provide error checking techniques to avoid the overflow or "divide-by-zero" issues described above, or to provide for graceful recovery when they do occur. Yet there is an advantage to allowing the end-users, such as professors—who may have little to no programming experience—to define certain aspects of the logic of the interaction. For example, in the case of multi-player games, such end-user-provided logic may define how a player's score is calculated. But by effectively allowing these non-programmers to program in a somewhat open-ended manner, there is a risk that undesirable behavior may occur as a result of the programming issues discussed above.

The present methods therefore allow a user (e.g., a professor, instructor, or manager) who wishes to create an interactive multi-user environment to define aspects of the environment such as parameters, state functions, and other aspects of the interaction. For example, the user may provide a proposed state function indicating that, at the end of each round of a game, a score earned by each player in the role of second user (e.g., a student or employee) is to be added to, multiplied by, divided by, or otherwise modified by another number (e.g., a game variable or constant). The system may automatically validate the user's proposed state function by confirming that it will not cause the game to exceed certain predefined limits of memory allocated to the game or time allotted for calculations. The system may further automatically validate the user's proposed state function by confirming that no divide-by-zero or memory overflow errors will occur as a result of the game logic provided by the user.

If the game logic is successfully validated, the game may be compiled or otherwise allowed. If an issue such as those discussed above is detected, the game logic is not successfully validated; the system may prevent the game from being created or used, and/or may make or suggest changes to the game logic that would allow it to be validated. In this way, it can be virtually guaranteed that the only errors to occur during a game will be with the logic of the game itself (e.g., the user chooses the wrong variables to multiply) or typographical errors within the user interfaces.

As noted above, many known systems implement a cumbersome invitation process for associating game users with a game instance. During such a process, intended users receive a link or other personalized code (e.g., via email) and must use the link or code to access the game. A drawback of this approach is that it does not scale well for large groups of users. That is, the effort on the administrator's part increases with number of users, because the administrator of the game (e.g., the professor) must communicate unique user-specific links to all intended users (e.g., students). The methods and systems disclosed herein overcome such drawbacks by allowing for a shared or common identifier of a game instance to be provided to intended users by a non-specific medium (e.g., sending a single email to the entire class as opposed to sending individual emails to each user/player, written on the blackboard, or included in a class syllabus) and allowing the users to login to a system and provide the game identifier. A user who has provided the game identifier is then associated with the game instance and placed into the game. The invitation and association process can be completed in constant time, regardless of the number of users. Game setup and invitations can be accomplished in roughly two minutes.

As discussed above, many existing multiplayer educational game systems require the administrator to specify the number of users, duration of the game and other game-specific parameters at the beginning of game session. There are several drawbacks to such an approach. First, if some of the users leave the game before the session ends, the administrator either has to continue making the decisions on behalf of the departed users for the game to progress, or restart the game session—or start a new session, including by sending out updated (i.e., additional) invitations to participants in the new session. Second, if some of the users want to join the game after the session has begun, it must be restarted. Third, any changes to game parameters or session duration may also require the administrator to restart the game session.

The tasks associated with restarting a game instance (or starting a new one) and transmitting invitations to players each consume large amounts of computing and network resources, whereas processing the interactions in an ongoing game typically requires fewer resources. On a platform hosting hundreds or even thousands of games, constantly performing these re-starting and re-invitation tasks as changes are made to parameters and participants in individual games represents a disproportionate share of the computing resources, leaving fewer resources (i.e., memory, processor capacity) available to handle the in-game experience, on which many users place primary importance.

To address these issues, the methods and systems disclosed herein allow users to leave or join a game session, or changes to be made to game session parameters or the duration of the game, without having to restart the game session. For example, the administrator may block users who have left the game session, and the decisions may be made by the computer automatically on their behalf. If a new user joins in the middle of a game session, the system may initially block the new user (or any of the users), allowing the administrator to unblock them when it is convenient. To allow for flexible game session duration, an administrator may put the game instance on pause and resume it later. Users may make their decisions when the game is unpaused.

In-game player management updating eliminates the need to restart a game session if settings must be altered for any reason, for example, during a gameplay in class. Allowing for changes to game setup during gameplay offers several advantages, including reduced usage of computing resources. Blocking and unblocking players enables gameplay to proceed uninterrupted. Viewing player status such as "no decision yet" enables the professor to view the exact decision state of the game for each student, and to make a decision about player management to allow the game to progress uninterrupted. In-game parameter management allows the instructor to change game variables, which in turn alters the classroom teaching environment and makes possible the introduction of new teaching objectives, all without interrupting the game's progression. The classroom instruction is therefore more efficient because the instructor can cover the relevant concepts, and variations thereof, in the same amount of time, for example, during the same lecture. Without this possibility, the instructor would need to restart the game session, consuming computing resources and delaying the class progression and reducing the total number of subjects to be taught in the class session. This outcome would result in less adoption of games during predetermined lecture sessions, and inferior game performance in situations where games are executed.

According to one aspect, a method for operating a computer-based multi-player educational game is provided. The method includes determining that an instance of a turn-based game requires input from a player during a current turn of the instance; determining a status of the player, the status controllable by an administrator of the instance; and responsive to the player having an inactive status, proceeding to a next turn of the instance.

According to one embodiment, the method includes, responsive to the player having an active status, waiting for input from the player during the current turn of the instance. According to another embodiment, the method includes receiving, from the administrator of the instance, an indication of the status of the player. According to another embodiment, the turn-based game is at least one of an economic simulation game and a forecasting tool used to forecast demand for a product. According to yet another embodiment, the method includes receiving, during the instance of the turn-based game, a change of at least one game parameter from the administrator; modifying at least one aspect of the instance according to the at least one changed game parameter; and resuming the instance without restarting play of the turn-based game. According to another embodiment, the method includes receiving from the administrator a request to pause the instance of the turn-based game; and responsive to the request, preventing the turn-based game from proceeding to a next turn.

According to another aspect, a method for creating an instance of a computer-based multi-user interaction session is provided. The method includes presenting a first user with a descriptor of at least one game; receiving, from the first user via a first user interface, a selection of the at least one game and an instance identifier; creating an instance of the game associated with the instance identifier; receiving, from a second user via a second user interface, input comprising the instance identifier; and enrolling the second user in the instance of the game associated with the instance identifier.

According to one embodiment, the instance identifier is an alphanumeric tag. According to another embodiment, the method includes receiving, from a plurality of users, input comprising the instance identifier; and enrolling the plurality of users in the instance of the game associated with the instance identifier. According to another embodiment, the method includes receiving, from the first user via the first user interface, a selection of at least one parameter used in determining an outcome of the instance of the game. According to yet another embodiment, the instance of the game is at least one of an economic simulation game and a forecasting tool used to forecast demand for a product.

According to another aspect, a method for validating a computer-based multi-user interactive environment design according to information specified in a design description is provided. The method includes receiving, in the design description, a stage descriptor of at least one game stage of a game instance and a user role to be performed by a user during the at least one game stage; receiving, in the design description, a plurality of parameter values and a proposed state function having a plurality of inputs for generating a state of the game instance; and validating that the proposed state function having a plurality of inputs will generate an expected result.

According to one embodiment, validating that the proposed state function having a plurality of inputs will generate an expected result comprises verifying that the plurality of inputs to the proposed state function are limited to at least one of the plurality of parameter values and a state of the game instance generated during at least one game stage of the game instance. According to another embodiment, the method includes verifying that the plurality of inputs to the proposed state function will allow the proposed state function to generate a result with at least one of a predetermined amount of computer memory and a predetermined amount of processing time.

According to another embodiment, the state of the game instance generated during at least one game stage of the game instance represents the state of the game instance generated during a current round or a previous round. According to yet another embodiment, the proposed state function comprises a mathematical operation on the at least one of the plurality of parameter values and the state of the game instance generated during a current round or a previous round. According to another embodiment, the method includes receiving, in the game description, for each parameter value of the plurality of parameter values, a display value associated with the parameter value to be displayed to a user of the game instance. According to another embodiment, the method includes receiving, in the game description, a second user role to be performed by a second user during at least one game stage. According to yet another embodiment, the method includes receiving, in the game description, information to be displayed in an interface associated with the user role. According to another embodiment, the method includes receiving, in the game description, information to be displayed in an interface associated with an administrator of the game instance.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 4C shows another exemplary user interface in accordance with some embodiments.

DESCRIPTION

Figure 1:
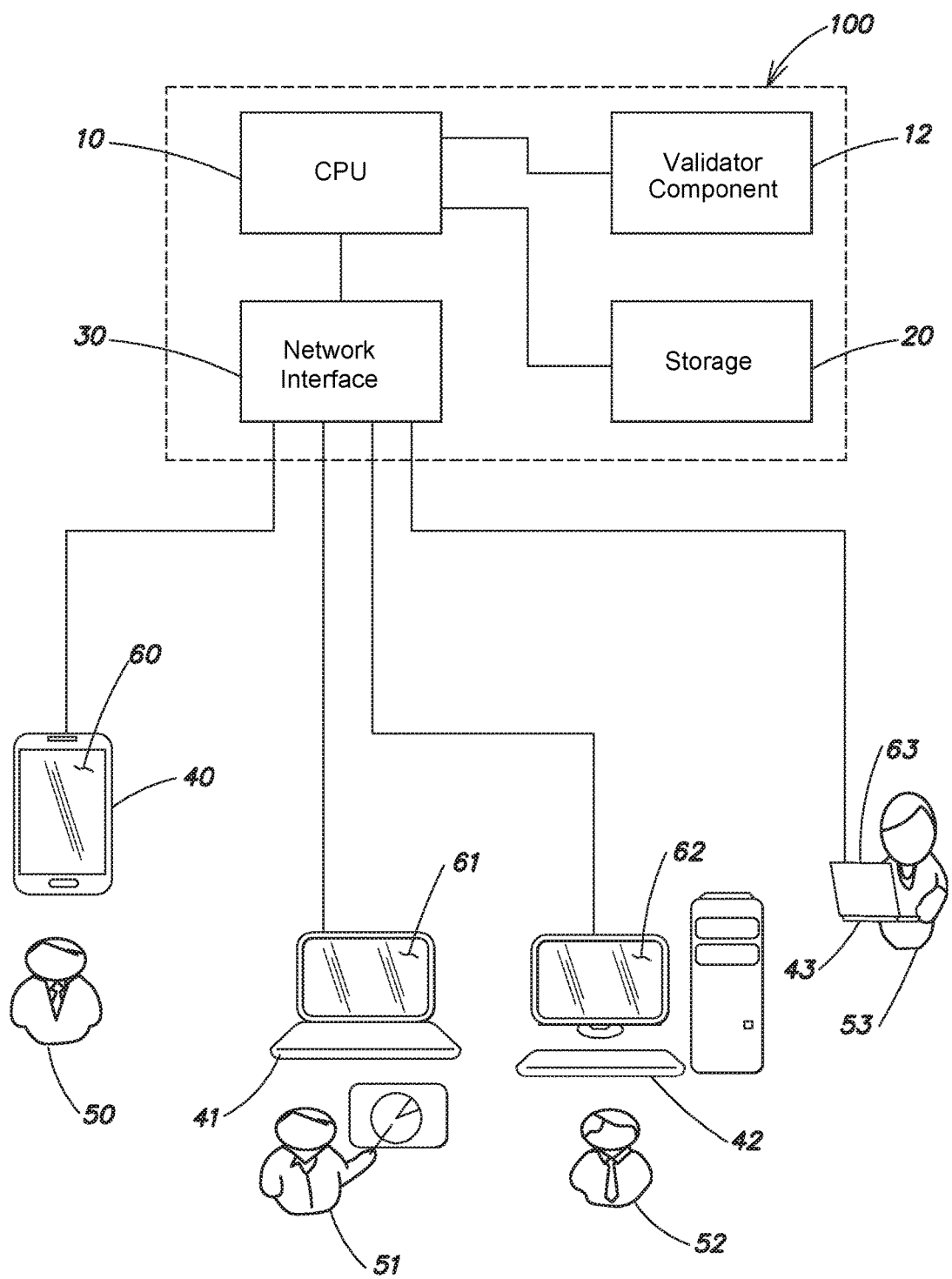
FIG. 1 shows a block diagram of a system capable of implementing various aspects of the present disclosure.

Aspects disclosed are not limited in their application to the details of construction and the arrangement of components set forth in the following description or illustrated in the drawings. The aspects disclosed are capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

FIG. 1 shows an exemplary system 100 in which various aspects of the present disclosure are practiced. A CPU 10 is provided for receiving user input via a network interface 30. The user input may include game logic, parameters, and/or commands provided by one or more users 50 involved in setting up an online multiplayer educational game, which may include games in which an instructor or a manager initiates a game instance and invites students or employees to participate and play a game (e.g., a turn-based game) during a finite period of time (e.g., during a lecture). The user input may further include input and interactions from the users 50, 51, 52, 53 during actual gameplay. The system 100 includes a validation component 12 for validating game logic and game parameters to avoid undesirable logic issues or other issues, as discussed more fully herein.

Users 50, 51, 52, 53 provide input through devices 40, 41, 42, 43, which may be servers, desktop or laptop computers, mobile devices including tablets, mobile phones, handheld computers, and the like. The CPU 10, via the network interface 30, causes interactive user interfaces 60, 61, 62, 63 to be displayed on the devices 40, 41, 42, 43. Users 50, 51, 52, 53 may have different roles at different times while interacting with user interfaces 60, 61, 62, 63. In one embodiment, a user 50 is a game developer who creates a game by providing game parameters and logic via the user interface 60. A user 51 is a game administrator (e.g., a professor) who chooses game parameters and creates a game instance allowing other users (e.g., users 52, 53) to play the game. In some embodiments, the roles of user 50 and the user 51 may be performed by the same person, meaning that a single person designs the logic of a game and creates game instances others can play. In one example, the roles of the user 50 and the user 51 may be performed by an educational instructor (e.g., a professor) who has designed a game and wishes to create instances of it to be played in a classroom setting by student-users 52, 53.

It will be appreciated that two student-users 52, 53 are shown here for exemplary purposes only; any number of users of the game (and associated user interfaces) may be provided for. Also, an educational gaming context is used here for example purposes only; any computer-based multi-user interactive environment which follows the structure of FIG. 1 may be used.

The system 100 further includes storage 20, which is used to store information associated with games, game instances, and/or users of the system 100. For example, the storage 20 may store the game logic, game parameters, stage descriptions, game state function, interface components, outcome matrices, and other data associated with one or more games and/or game instances. The storage may comprise a relational or non-relational database, flat/delimited files, spreadsheets, or other formats for storing information.

Components of the system 100 may be connected directly to each other and to devices 40, 41, 42, 43, or may be connected via Ethernet or a wide-area network (WAN), such as the Internet. For example, during gameplay, users 51, 52, 53 may be present in any physical location having wireless network capabilities, and an instructor-user 51 and student-users 52, 53 are each connected to the system 100 via network interface 30 and interacting with the game using desktop or laptop computers, mobile devices (e.g., mobile phones or tablets), and/or other handheld devices wirelessly connected to the system 100. The instructor-user 51 and the student-users 52, 53 may be in different locations on campus or around the world, and may be participating in online courses, or courses with an online component. The scalability of game configuration and gameplay made possible by the present embodiments may allow for large-scale games involving more players than may be enrolled in a typical course. In one example, the system 100 may be adopted for use in massive open online courses (MOOC).

During gameplay, the CPU 10 controls the operation of the game instance according to the game logic and parameters provided for the game. For example, during creation and initiation of the game instance, the CPU 10 may cause to be displayed, on the user interface 61 of user 51, instructions for setting up the game. Users attempting to access the game may interact with the CPU 10 via user interfaces on their devices in order to associate themselves with the game instance. As the game progresses, information may be displayed, and input requested, by the CPU 10 via the user interfaces 61, 62, 63.

While a single CPU 10 is depicted here for the sake of simplicity, it will be appreciated that functions performed by the systems and methods described herein may be performed by multiple components. For example, a development processor may be provided for the creation and validation of games, whereas a web server may host the completed games and handle the gameplay and user verification aspects discussed herein.

Figure 2:
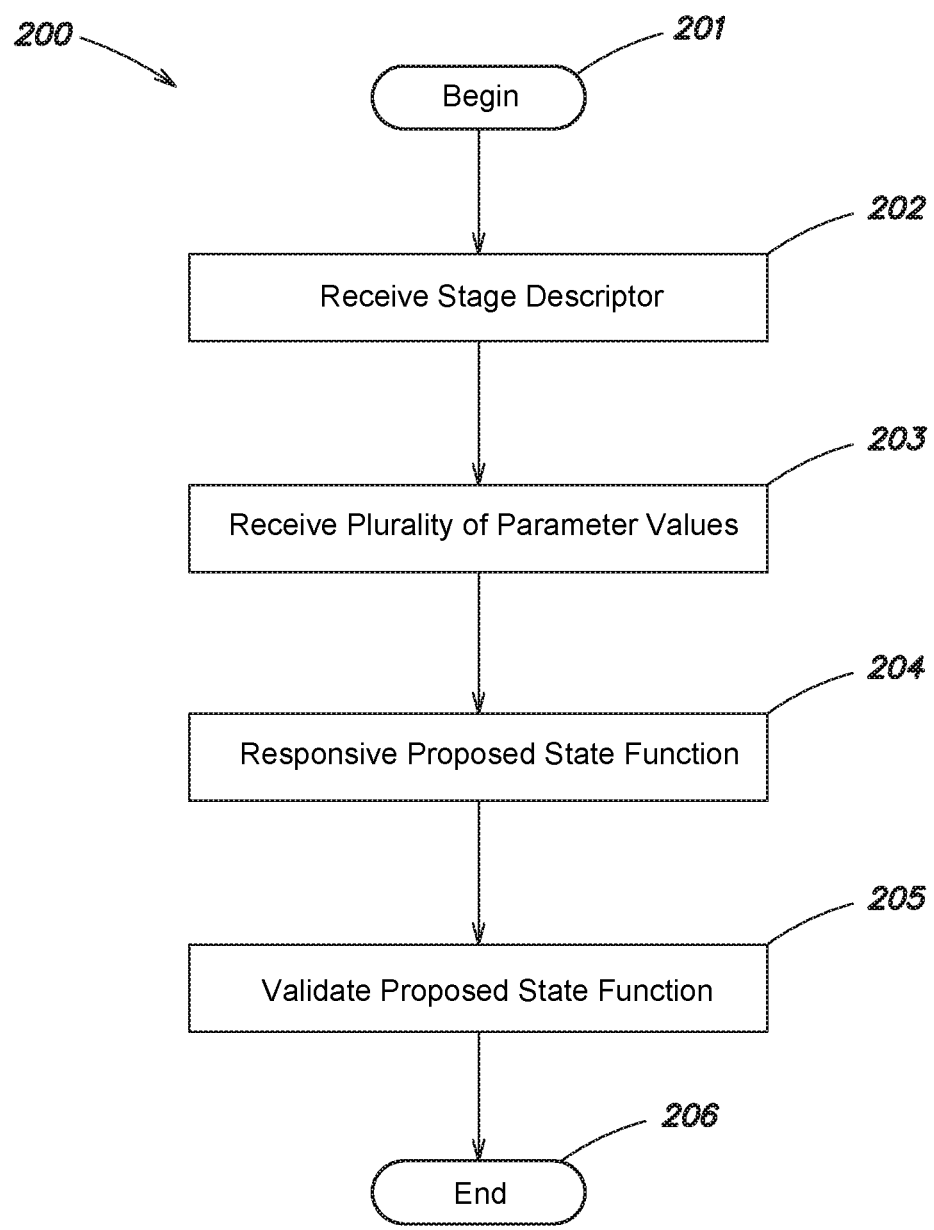
FIG. 2 shows a flow chart of an exemplary method for validating a computer game design according to information specified in a game description.

FIG. 2 shows an exemplary process 200 for validating a computer game design according to information specified in a game description.

At block 201, process 200 begins.

At block 202, the system receives a stage descriptor of at least one game stage of a game instance, and a user role to be performed by a user during the at least one game stage. In one embodiment, the system receives the stage descriptor and the user role (and other information discussed in other blocks of process 200) via an input file provided to the system (e.g., uploaded by user 50).

In one embodiment, a game instance is made up of a number of rounds, and within each round are a number of stages, which may involve such actions as receiving a user's input, displaying a status of the game, or waiting for user input. The stage descriptor provides information about each stage within a round. The stage descriptor may include, for example, a name or ID of the stage; the user(s) or role(s) involved in the stage, and any input to be obtained during the stage.

The input file containing the stage descriptor may be in any format suitable for storing such data, and may contain a stage descriptor, parameter values, the proposed state function, any necessary game constants, and any user interface configuration information used in creating or operating the game. In one embodiment, the input file contains one or more attribute-value pairs, and may be provided in a JavaScript Object Notation (JSON) format. The attribute-value pairs are used by the system to populate information in the game, such as user interface text, game parameters, user input, and the like. In some embodiments, the system enforces certain naming conventions for user-created functions, variables, constants, or other structures or elements. For example, user-defined elements may be required to begin with an upper-case letter, whereas elements starting with a lower-case letter may be reserved for native or system-created elements.

In some embodiments, game information (such as user identifiers, current status, recent outcomes, etc.) may be stored in a matrix in storage 20 or in memory. Each row in the matrix may represent a particular stage or round of gameplay, and each column represents a particular attribute for a user. Thus, a specific row/column location would store that attribute for that user in that stage or round. In some embodiments, game states are stored in a list, in which each state is an associative array. With these data structures, given a game written in GDL (Game Description Language), its memory footprints can be computed from its state definitions. In addition, GDL ensures that game states are computed through well-defined functions using data from predefined, hence limited number of states. With GDL and its validation, game developers only need to focus on the functional aspects of games. In some embodiments, as game parameters are changed during gameplay, the most current calculation method for a particular game state is used in subsequent turns and rounds. For example, if the administrator changed a multiplier parameter from 100% to 150% between a first player's turn and a second player's turn, the first player's turn would apply a multiplier parameter of 100%, and the second player's turn would apply a multiplier parameter of 150%. In other embodiments, the outcomes of previous turns would be updated to reflect the most current multiplier parameter. To continue the previous example, the outcome of the first player's turn would be modified to reflect a multiplier parameter of 150%.

An example stage descriptor for an investment simulation game appears as follows: "stages": [{"id": "Decision", "role": 0, "decisions": ["InvestDcn"]}]

In this example stage descriptor, the first attribute-value pair represents that the "id" of the stage is "Decision." The next pair indicates that the user in role "0" is expected to take some action during the stage. The final pair suggests that the user's input is to be received and stored into the variable "InvestDcn".

This example is for illustration only, and other attribute-value pairs or other information may be included. For example, a user in role "1" may also be prompted to provide input during the same stage. Any number of stages may also be provided for during a given game. In some embodiments, the number of rounds may optionally be provided in the input file, either as a selectable parameter or as a defined limit. Even so, a user (e.g., a user in role "1") may be provided the option during the game session to suspend or terminate the game early. In other embodiments, no limit on the number of rounds may be provided, and gameplay may be allowed to proceed indefinitely, or may be terminated after a certain amount of time or according to a limit set by the system or the first user (e.g., a professor).

At block 203, the system receives, from the input file, a plurality of parameter values. In one embodiment, a user playing or administering the game is given the option to select a parameter from a plurality of parameters. By allowing the user to select one of a number of predefined parameters, the user may interact with the game in a bounded way, in which unexpected input is not received. The plurality of parameter values may include a number of options to be displayed to the user, as well as the corresponding underlying values that will be applied upon selection of a displayed option. A default parameter value may also be indicated, with the associated display option populating a pull-down menu or other input option until another option is chosen. An example plurality of parameter values for an investment simulation game appears as follows:

```
"params": {
"StartMoney": [{"value": 100, "show": "$100"}],
"Factor": [{"value": 100, "show": "100%"},
{"value": 125, "show": "125%"},
{"value": 150, "show": "150%", "default": true},
{"value": 175, "show": "175%"},
{"value": 200, "show": "200%"}]}
```

In this example, the element "StartMoney" has an attribute "value" of 100 and an attribute "show" of "$100." The system may use this information in a user interface to display "$100." The text "$100" is not necessary for performing calculations, however, and so the corresponding "value" of 100 is used instead. The element "Factor" is also provided, with a number of attribute-value pairs indicating that when the "Factor" element is displayed, the values (100, 125, 150, 175, and 200) are to be displayed as their corresponding percentages ("100%," "125%," "150%," "175%," and "200%"). "150%" is the default value that should be initially displayed. The system may impose certain limitations on the plurality of parameter values. For example, parameter values may be required to be integers, and within a certain known range.

At block 204, the system receives, from the input file, a proposed state function having a plurality of inputs for generating a state of the game instance. The proposed state function represents a user's intended function or method for calculating a state (e.g., score or outcome) of the game during a particular stage, round, or game. The proposed state function may include numerical constants, numerical variables, random numbers, input from the user, or results (e.g., output from the proposed state function) generated during a current or previous stage or round of the current game instance. The proposed state function may be an assignment and/or involve mathematical or logical operations, such as addition, subtraction, multiplication, division, OR, AND, NOT, XOR, and other operations as known in the art.

Proposed state functions may be provided for individual users or roles or for all users or roles. Example state functions for a single player (e.g., a student) in the exemplary investment simulation game are provided:

```
"state": [
{"storeForStudent": "Investment",
"what": {"decision": "InvestDcn", "default": 0}},
{"storeForStudent": "Profit",
"what": {"if": "Decided",
"then": {"sum": ["StartMoney", "RevenuePerStudent",
{"neg": "Investment"}]},
"else": 0}}]
```

In this example, the "state" element contains an attribute-value pair identifying that an "Investment" variable should be stored for each student, with the "decision" value being the user's input obtained through the "InvestDcn" as defined in the "stage" element above. A default value of 0 is applied if the user has not suitably entered input. The "state" element also contains a logical attribute value pair indicating what should happen if the "Decided" variable has been set, indicating that the user has made a selection. If the logical condition is met in this case, then a value "sum" is stored representing the sum of the money held by the student at the beginning of the round and the revenue earned during that round, minus the investment made by the student in that round.

An example state function to be applied to all players in the exemplary investment simulation game is provided:

```
{"storeGlobal": "RevenuePerStudent",
"what": {"div": {"mul": ["SumInvestments", "Factor"]},
"by": {"mul": [100, {"max": [1, "NumInvestments"]}]}}}
```

In this example, the "state" element contains an attribute-value pair indicating that a "RevenuePerStudent" should be assigned the same value for each user (indicated by the "storeGlobal" attribute). The "RevenuePerStudent" is determined by dividing the product of SumInvestments (the sum of all students' investments) and Factor (one of the percentages discussed above), by 100 times the number of investments (or 1, if no investments have been made during the round).

At block 205, the system validates that the proposed state function having a plurality of inputs will generate an expected result. This validation may be performed, for example, by ensuring that no endless loops, memory overflow, divide-by-zero, or other undesirable conditions occur. For example, in calculating the state function, the system may allow the game to employ a "for" loop terminating in a finite number of steps, but may disallow recursive function calls, while loops, or "goto" functions, any of which may cause an endless loop situation. The system may also enforce a limit on the range of numbers used in calculations, to ensure that they can be handled by the data structures storing them, thereby avoiding a numeric overflow. The system may also identify situations where a divide-by-zero error may occur, and either disallow the operation or gracefully modify it to avoid such an error. To illustrate with the example in block 204, if the proposed state function simply called for division by "NumInvestments," which may be zero, the system may modify the operation as above, to ensure that the denominator is 1 or higher. Alternatively, the operation may be modified to return a very large number (e.g., 9999999) if a divide-by-zero operation is attempted during gameplay. The system may also force an operation to return an integer or other number bounded in size (e.g., short, float, long, etc.) by rounding or truncating the result of the operation. The system may also validate the proposed state function by verifying that the plurality of inputs to the proposed state function are limited to known values, such as the plurality of parameter values, or an outcome of the proposed state function generated during the current or an earlier round. The system may also impose additional constraints, such as a limit on the number of game parameters, or the number of statements in the proposed state function.

By validating the proposed state function in such a way, game instances of games specified in the game description can be guaranteed to have a number of properties. First, computations performed in the game instance will be guaranteed to terminate in a known number of steps (time boundedness) and require a known amount of memory (space boundedness). The game instance will be guaranteed to advance round-by-round for any reasonable number of rounds (continuity), and all calculations will produce valid, finite numbers (totality).

If the proposed state function is successfully validated, it is accepted by the system, and the game description may be stored, or may be compiled into a game application. If the proposed state function is not successfully validated, the game description may be rejected, and suggestions for repairing the proposed state function or other errors may be offered.

At block 206, process 200 ends.

Figure 3:
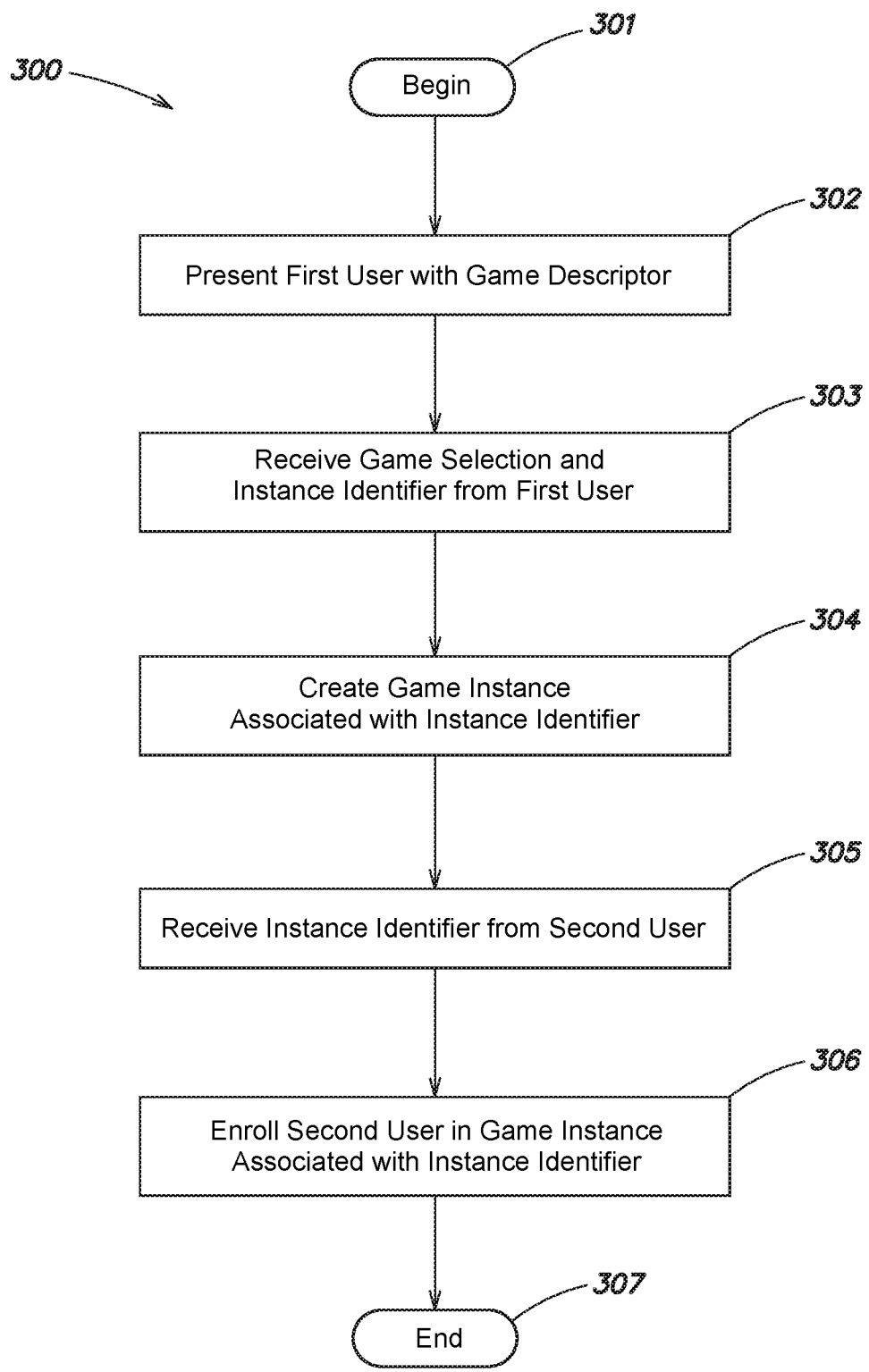
FIG. 3 shows a flow chart of an exemplary method for creating an instance of a computer game.

FIG. 3 shows an exemplary process 300 for creating an instance of a computer game, for example, the computer game for which the input file provided a specification in process 200. This process flow represents, for example, the steps that would occur when an instructor (in this example, the first user) creates a game instance to be played during a class by students (the second and/or third users).

At block 301, process 300 begins.

At block 302, the system presents a first user (e.g., user 51) with a descriptor of at least one game. The descriptor may be presented via a user interface (e.g., user interface 61 on device 41). The descriptor may identify one of a number of games available (e.g., "InvestmentGame").

At block 303, the system receives, from the first user via a first user interface, a selection of a game of the at least one game and an instance identifier. The user may select the game by clicking on the descriptor presented at block 302. For example, the user may click on the descriptor "InvestmentGame" with a mouse, trackball, touchscreen, or other input device. In some embodiments, the user may type the name of the desired game. The system also receives an instance identifier from the user. In one embodiment, the instance identifier is a "tag" or other textual identifier. The instance identifier is preferably, but not necessarily, one that is easily communicated via a number of mediums, such as being written down, spoken, or printed. For example, the instance identifier for an instance of the game "InvestmentGame" to be played in an instructor's Fall 2015 class may be the tag "invest-fall2015."

In some embodiments, the tag may also contain information used to control the user's role, parameters, or other aspects of a game instance. In one embodiment, the tag may indicate what role should be assigned to a user who uses that tag to join a game instance. For example, a tag "game1_role2" may automatically assign that user to role 2 in game 1 when the tag is used to join a game instance.

At block 304, the system creates an instance of the game associated with the instance identifier. The system (e.g., the CPU 10) uses the input and parameters provided in the input file in method 200 to initiate the game play. In some embodiments, the game may be deployed on a platform for such applications, such as the JavaScript App Platform offered by Meteor Development Group of San Francisco, Calif.

At block 305, the system receives, from a second user via a second user interface, input comprising the instance identifier. The second user may be an intended player of the game. For example, upon being prompted, the second user (e.g., a student) may enter the tag "invest-fall2015" associated with the game instance created in blocks 303 and 304.

At block 306, the system enrolls the second user in the instance of the game associated with the instance identifier. For example, one or more columns in the matrix associated with the game instance may be created for storing attributes of the second user.

Once the game instance has been created and the second user joined to it, the game instance may be paused to allow time for other users to join, or for the first user (e.g., the instructor) to begin the game instance. The first user may also have the opportunity to change game parameters during game play (e.g., the parameters 412, 414, 416 in FIGS. 4A and B), with the resulting changes to the game logic being carried out immediately, in the next stage, in the next round, or at some other point in the game.

It will be appreciated that the example here, with only a second user enrolled in the game, is for illustration only. Any number of additional players may be allowed to join according to system resources and the rules and parameters of the game.

Figure 4A:
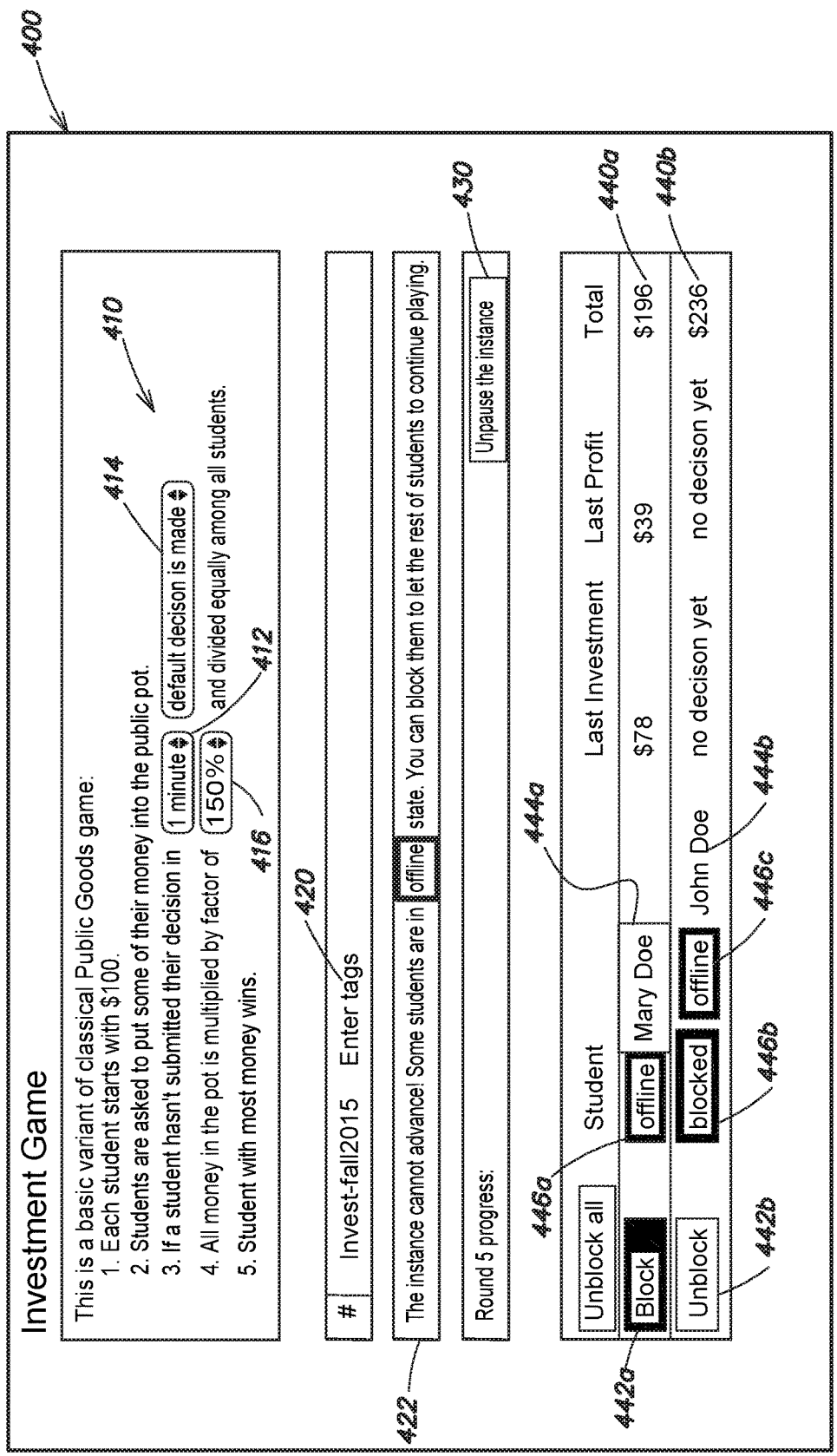
FIG. 4A shows an exemplary user interface in accordance with some embodiments.
Figure 4B:
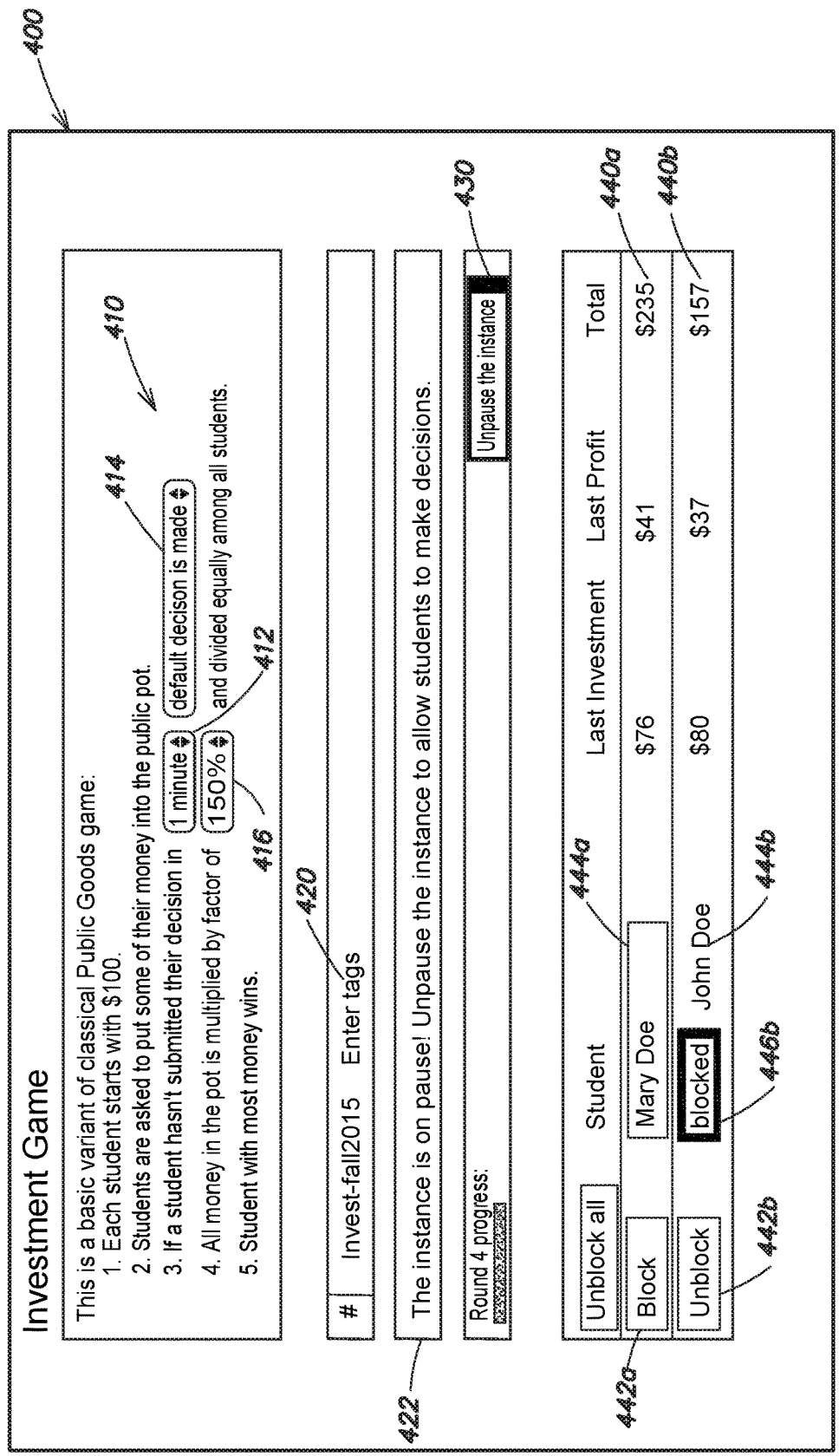
FIG. 4B shows another exemplary user interface in accordance with some embodiments.

Different views of an exemplary interface 400 presented to the first user are shown in FIGS. 4A and 4B. The interface 400 may provide the first user (e.g., a professor, an instructor, or a manager) with information and instructions about the game, and allow the first user to select parameters and control the flow of the game. For example, game rules 400 may be displayed, with selectable parameters 412, 414, 416 provided. Some parameters (e.g., selectable parameters 412, 414) may relate generally to controlling the pace and flow of the game, such as the amount of time to wait for user input, and the actions to take if the user input is not provided. Other selectable parameters may be provided as a result of their inclusion in the game information provided in process 200. In this example, the selectable parameter 416 corresponds to the "Factor" element addressed in block 203 of process 200. The first user may provide the instance identifier through input element 420, which may allow for one or more game-playing users in the role of second user (e.g., students or employees) to type or click tags or other instance identifiers to be used in creating a game instance. A status region 422 may contain a message about the current state of a game session, as well as any suggestions for actions to be taken by any of the users of the game.

Information about currently enrolled players in the game may also be displayed, including their names, current and historical performance and statistics in the game, and their current status as an active or blocked player. For example, the players' names 444a, b may be displayed. An indication of the players' status (e.g., offline or blocked) is shown by indicators 446a-c. A current score 440a, b or other tally for the player (e.g., a total amount of money earned in the game so far) may also be provided.

Buttons 442a, b allowing the first user to block or unblock individual player may be displayed. When a player is blocked during game play, computer logic may be used to play in the player's place. When the player is unblocked, the player may resume control of gameplay. General game control may also be controlled from the interface 400 for the duration of the game. For example, a pause button 430 may allow the first user to pause or unpause the game instance in order to discuss a concept or an aspect of the game, and then resume gameplay.

In the example screenshot shown in FIG. 4A, two players 444a, b are participating in a game session. An indicator 446a shows that the first player is currently offline, and indicators 446b, c show that the second player 444b is currently both offline and blocked from the game. For that reason, a message in the status region 422 informs that the game instance cannot advance, because some players are in offline or time-out status. The status region 422 further suggests that the offline/time-out players may be blocked (e.g., with button 442a) to allow the game to progress with other students making decisions.

In the example screenshot shown in FIG. 4B, a user (e.g., user 51) has paused an instance of a game in which two players 444a, b are again participating. Indicator 446b shows that the second player 444b is currently blocked from the game. A message in the status region 422 informs that the game may be unpaused (e.g., with button 430) to allow players to continue to make decisions.

A view of an exemplary interface 450 presented to the second user in block 303 is shown in FIG. 4C. An overview of the game (including the parameters set by the first user) is presented in a status region 460. The second user is provided the opportunity to submit an investment amount via an input field 470. A current status of the player, as well as historical information (e.g., an amount invested in one or more previous rounds) is presented in a region 480.

Returning to FIG. 3, at block 307, process 300 ends.

Figure 5:
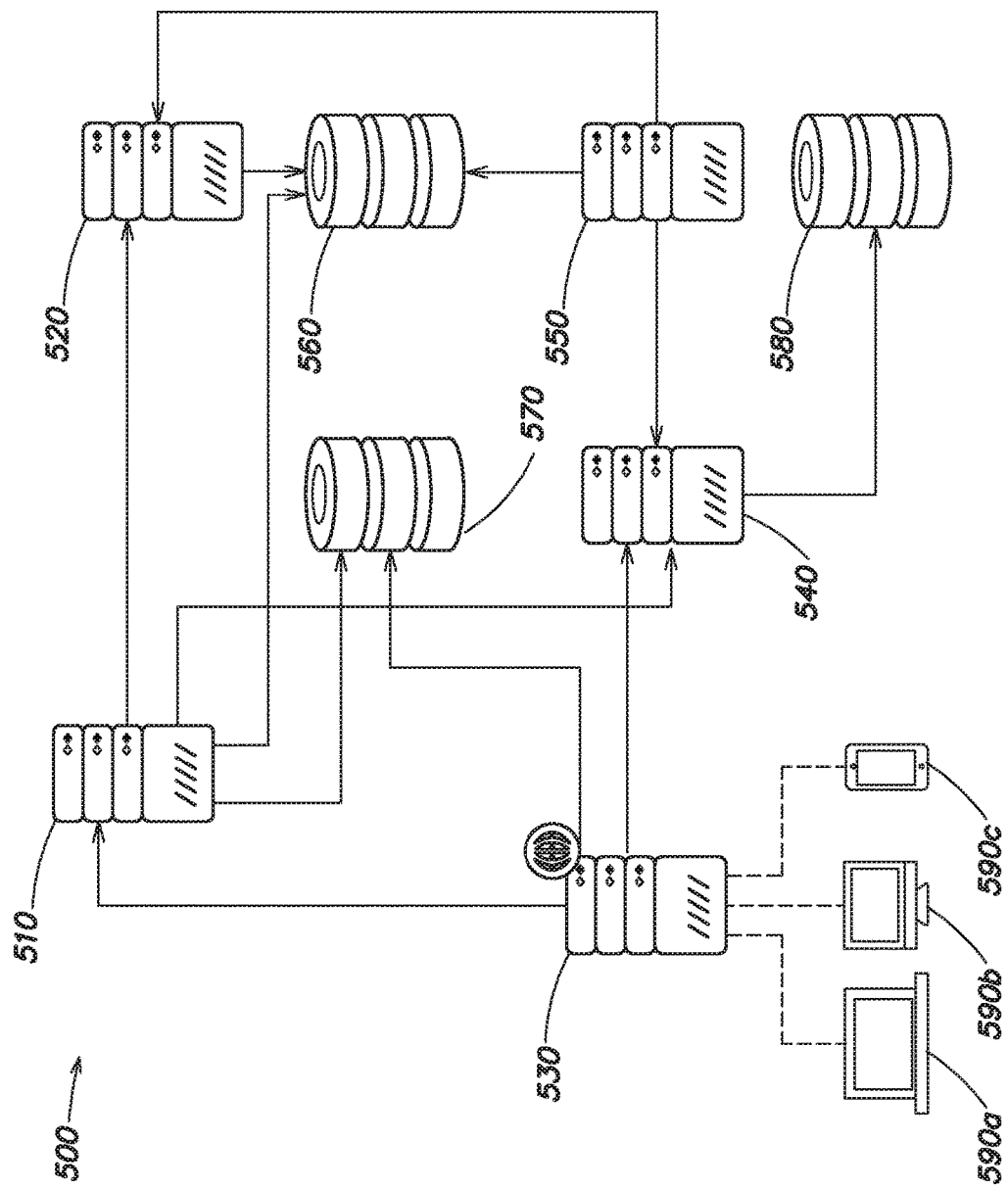
FIG. 5 shows a block diagram of another system capable of implementing various aspects of the present disclosure.

An exemplary system 500 for performing some or all aspects of the methods described herein can be seen in FIG. 5. It will be appreciated that the components shown are for illustrative purposes, and not all of the components seen in system 500 may be necessary or provided in all embodiments. In system 500, a GDL game engine 510 is provided for computing the game states during game play. A game designer service 550 and a validator service 520 receives input (e.g., in the form of GDL) from a game designer (e.g., a professor or other educator) and parses, validates, and/or compiles the GDL, confirming and creating an executable program for use during game play. The game validator service 520 is configured to detect issues described above (such as overflow or divide-by-zero errors) and issue an error message and/or address the issue by modifying one or more parameters or aspects of the game design. A game repository 560 and a game data repository 570 store created games and their associated data, respectively. The associated data stored in the game data repository 570 may include player inputs, game states, and the like.

A game client 530 is configured to process gameplay, including by communicating with user clients 590a-c, which may be desktop or laptop computers, mobile or handheld devices, or other computing devices. An administration service 540 administers game instances and users, for example, by processing user authentication, setting and changing user access and permissions, processing user payments where required, and the like. A customer data repository 580 stores data including customer (i.e., user) credentials, roles, contact information, preferences, display settings, institutional affiliation, payment information, and the like. The game client 530 and/or the customer data repository 580 store and retrieve data from the game repository 560 and the game data repository 570. The game client 530 also communicates with the GDL game engine 510 to calculate and/or retrieve game states during gameplay.

It will be appreciated that the computer game embodiments discussed herein are provided for illustrative purposes, and that the embodiments disclosed may encompass any number of online multi-user interactions. In one embodiment, the systems and methods disclosed are used for purposes of performing demand forecasting simulations in a manufacturing or business environment in order to reduce uncertainty and predict variability in demand. In one embodiment, users may participate in an online interaction to exchange information and/or evaluate real-life performance data.

In one example, a sales manager (assigned role A) oversees 10 salespeople (assigned role B) in a company, with each salesperson needing to make a daily forecast to one of 10 engineers (assigned to role C) in the company, with the engineers responsible for creating products for sale. As described above with reference to process 300, the sales manager creates a game instance, and selects parameters for actual costs, prices, and anticipated variability in demand uncertainty that the salespeople and engineers are trying to address.

For example, the sales manager may set a parameter for the price of a product to be $100, and a parameter for the cost to produce the product to be $50. The sales manager may further set parameters for anticipated demand. For example, the sales manager may set a lower limit for anticipated demand of 100 units, and an upper limit of anticipated demand for 200 units. Information (e.g., a tag) for logging into the game is then provided to the salespeople and the engineers, who use that information to log into the game, where they may be assigned roles B and C, respectively. Players in role B are matched to players in role C such that there are "teams" of two players.

At the start of a game instance, a player in role B is prompted to enter a forecast for the number of deals that player B expects to close that day. The game then shows that forecast to that player's teammate in role C. The player in role C is then also prompted to enter a forecast for the number of deals that player B expects to close that day. The player in role C is also prompted to decide how many products should be manufactured or otherwise readied for fulfillment of those deals closed by the player in role B.

At the end of an actual or simulated day, the actual number of deals closed by player B is determined. Results may be generated and shared with any of the players in roles A, B, and/or C, or others, showing a number of statistics and comparisons. For example, the results may show how the forecasts of players in roles B and C in a particular game compared to one another; in other words, the "winner" of a particular game may be determined. In another example, the results may compare how all players in role B and/or role C across all of the game instances did against each other, with those providing the most accurate forecasts being ranked higher in the results. In another example, all of the players in all roles across all of the game instances may be ranked. In some embodiments, the game may be repeated daily, and aggregate ranking over time may also be provided. For example, players may be ranked according to the aggregate accuracy of their daily forecasts over the course of several days, a week, a month, a quarter, a year, or any other time period desired.

The results may also be used to improve forecasting. For example, overall forecasts may be determined with reference to the forecasts made each day by players, with players who have given relatively accurate forecasts in the past given more weight in determining future forecasts.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A method for validating a computer-based multi-user interactive environment design according to information specified in a design description, comprising acts of:
   receiving, in the design description, a stage descriptor of at least one game stage of a game instance and a first user role to be performed by a first user during the at least one game stage;
   receiving, in the design description, a plurality of parameter values and a proposed state function having a plurality of inputs for generating a state of the game instance;
   validating that the proposed state function having the plurality of inputs will generate an expected result;
   presenting the first user with a descriptor of at least one game that includes the at least one game stage;
   receiving, from the first user via a first user interface, an instance identifier and a selection of a game associated with the instance identifier;
   creating an instance of the game associated with the instance identifier;
   receiving, from a second user via a second user interface, input comprising the instance identifier; and
   enrolling the second user in the instance of the game associated with the instance identifier.

2. The method of claim 1, wherein validating that the proposed state function having a plurality of inputs will generate an expected result comprises verifying that the plurality of inputs to the proposed state function are limited to at least one of the plurality of parameter values and a state of the game instance generated during at least one game stage of the game instance.

3. The method of claim 1, further comprising verifying that the plurality of inputs to the proposed state function will allow the proposed state function to generate a result with at least one of a predetermined amount of computer memory and a predetermined amount of processing time.

4. The method of claim 1, wherein the state of the game instance generated during at least one game stage of the game instance represents the state of the game instance generated during a current round or a previous round.

5. The method of claim 1, wherein the proposed state function comprises a mathematical operation on the at least one of the plurality of parameter values and the state of the game instance generated during a current round or a previous round.

6. The method of claim 1, further comprising receiving, in the game description, for each parameter value of the plurality of parameter values, a display value associated with the parameter value to be displayed to a user of the game instance.

7. The method of claim 1, further comprising receiving, in the game description, a second user role to be performed by a second user during at least one game stage.

8. The method of claim 1, further comprising receiving, in the game description, information to be displayed in an interface associated with the user role.

9. The method of claim 1, further comprising receiving, in the game description, information to be displayed in an interface associated with an administrator of the game instance.

10. The method of claim 1, wherein the instance identifier is an alphanumeric tag.

11. The method of claim 1, further comprising:
    receiving, from a plurality of users, input comprising the instance identifier; and
    enrolling the plurality of users in the instance of the game associated with the instance identifier.

12. The method of claim 1, further comprising receiving, from the first user via the first user interface, a selection of at least one parameter used in determining an outcome of the instance of the game.

13. The method of claim 1, wherein the instance of the game is at least one of an economic simulation game and a forecasting tool used to forecast demand for a product.

14. The method of claim 1, wherein the game is a turn-based game and the first user is a player of the turn-based game, further comprising:
    determining that the instance of turn-based game requires input from the first player during a current turn of the instance;
    determining a status of the player, the status controllable by an administrator of the instance; and
    responsive to the player having an inactive status, proceeding to a next turn of the instance.

15. The method of claim 14, further comprising, responsive to the player having an active status, waiting for input from the player during the current turn of the instance.

16. The method of claim 14, further comprising receiving, from the administrator of the instance, an indication of the status of the player.

17. The method of claim 14, wherein the turn-based game is at least one of an economic simulation game and a forecasting tool used to forecast demand for a product.

18. The method of claim 14, further comprising:
receiving, during the instance of the turn-based game, a change of at least one game parameter from the administrator;
modifying at least one aspect of the instance according to the at least one changed game parameter; and
resuming the instance without restarting play of the turn-based game.

19. The method of claim 14, further comprising receiving from the administrator a request to pause the instance of the turn-based game; and
responsive to the request, preventing the turn-based game from proceeding to a next turn.

\* \* \* \* \*

UNITED STATES PATENT AND TRADEMARK OFFICE
CERTIFICATE OF CORRECTION

PATENT NO. : 10,272,338 B2
APPLICATION NO. : 15/400138
DATED : April 30, 2019
INVENTOR(S) : Ali Ozalp Ozer et al.

Page 1 of 1

It is certified that error appears in the above-identified patent and that said Letters Patent is hereby corrected as shown below:

In the Specification

Column 1, Line 5, insert -- FEDERALLY SPONSORED RESEARCH
This invention was made with government support under NSF-SBIR Grant Phase I Award No. 1621504 awarded by the National Science Foundation. The government has certain rights in the invention. --.

Signed and Sealed this
Twenty-fourth Day of August, 2021

Drew Hirshfeld
*Performing the Functions and Duties of the
Under Secretary of Commerce for Intellectual Property and
Director of the United States Patent and Trademark Office*